United States Patent
Peng et al.

(10) Patent No.: US 8,385,183 B2
(45) Date of Patent: Feb. 26, 2013

(54) LIGHT DELIVERY WAVEGUIDE

(75) Inventors: Chubing Peng, Sewickley, PA (US);
Edward Charles Gage, Lakeville, MN
(US); Kalman Pelhos, Pittsburgh, PA
(US)

(73) Assignee: Seagate Technology, LLC, Cupertino, CA (US)

( * ) Notice: Subject to any disclaimer, the term of this patent is extended or adjusted under 35 U.S.C. 154(b) by 358 days.

(21) Appl. No.: 12/613,458

(22) Filed: Nov. 5, 2009

(65) Prior Publication Data

US 2011/0103201 A1  May 5, 2011

(51) Int. Cl.
*G11B 7/00* (2006.01)
(52) U.S. Cl. ................. 369/112.27; 369/13.13
(58) Field of Classification Search ............... 369/13.13, 369/13.33, 112.27, 112.2, 13.32, 13.24, 13.14, 369/13.02, 13.12; 385/43, 28, 16, 89
See application file for complete search history.

(56) References Cited

U.S. PATENT DOCUMENTS

| | | | |
|---|---|---|---|
| 6,580,850 B1 * | 6/2003 | Kazarinov et al. | 385/28 |
| 6,762,977 B1 | 7/2004 | Gage | |
| 6,944,112 B2 | 9/2005 | Challener | |
| 8,064,741 B2 * | 11/2011 | Cherchi et al. | 385/28 |
| 2006/0187564 A1 | 8/2006 | Sato et al. | |
| 2006/0233062 A1 | 10/2006 | Bedillion et al. | |
| 2011/0227487 A1 * | 9/2011 | Nichol et al. | 315/158 |

FOREIGN PATENT DOCUMENTS

| | | |
|---|---|---|
| JP | 2004-184986 A | 7/2004 |
| JP | 2007-058900 A | 3/2007 |
| JP | 2007-200475 A | 8/2007 |
| JP | 2007-257753 A | 10/2007 |

OTHER PUBLICATIONS

Challener et al., "Heat-assisted magnetic recording by a near-field transducer with efficient optical energy transfer," Nature Photonics, vol. 3, Apr. 2009, www.nature.com/naturephotonics, pp. 220-236.
Challener et al., "Practical plasmonics," Nature Photonics, vol. 3, Apr. 2009, www.nature.com/naturephotonics, p. 236.

* cited by examiner

*Primary Examiner* — Ali Neyzari
(74) *Attorney, Agent, or Firm* — HolzerIPLaw, PC

(57) ABSTRACT

A light source and a waveguide are mounted on a recording head slider. Light rays are emitted from the light source into the waveguide. The waveguide may include two core layers for light ray transmission. The first core layer enhances light coupling efficiency from the light source to the second core layer. The second core layer transforms a profile of the light. The waveguide may include a tapered portion with a narrow opening near the light source and a wider opening near the tapered portion exit. The light rays passing through the waveguide may be directed toward a collimating mirror. The collimating mirror makes the light rays parallel or nearly parallel and re-directs the light rays to a focusing mirror. The focusing mirror focuses the collimated light rays to a spot on a magnetic media disc.

20 Claims, 12 Drawing Sheets

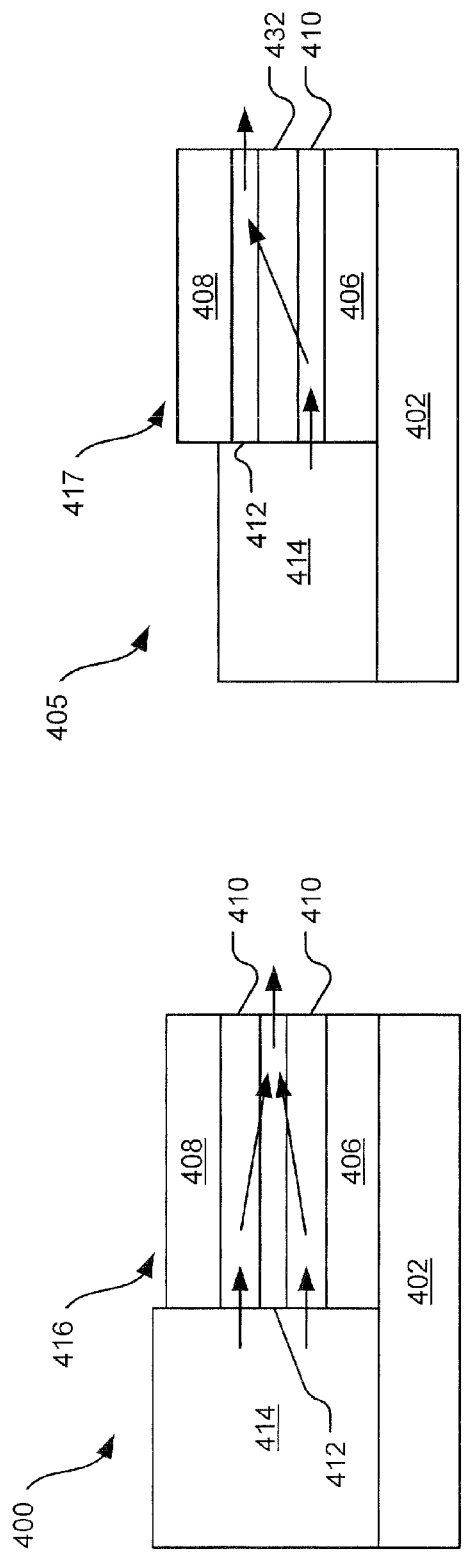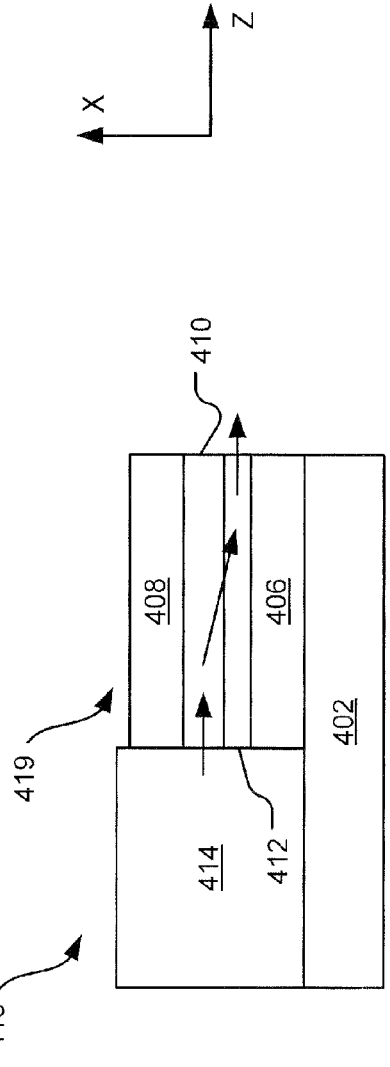

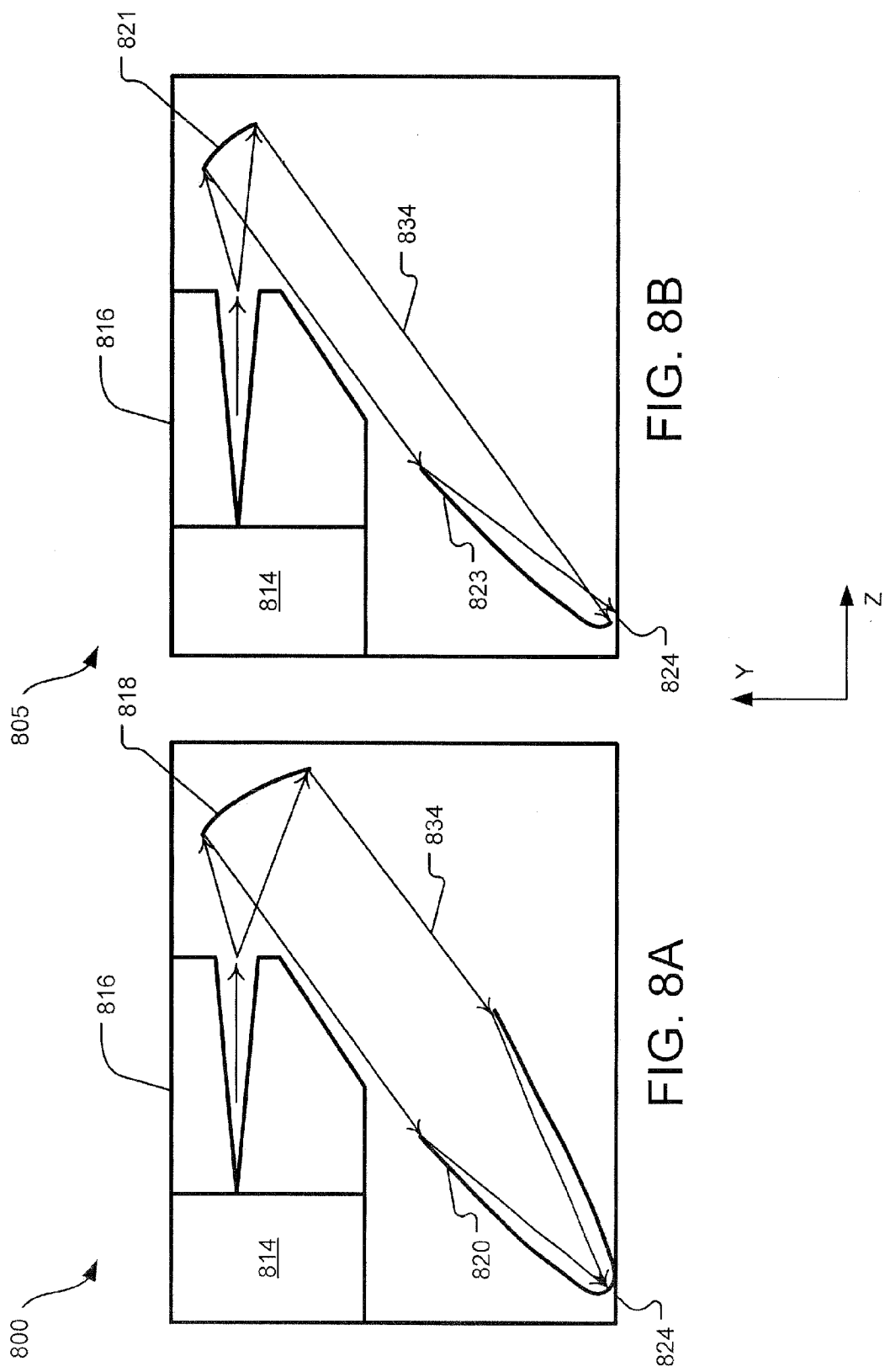

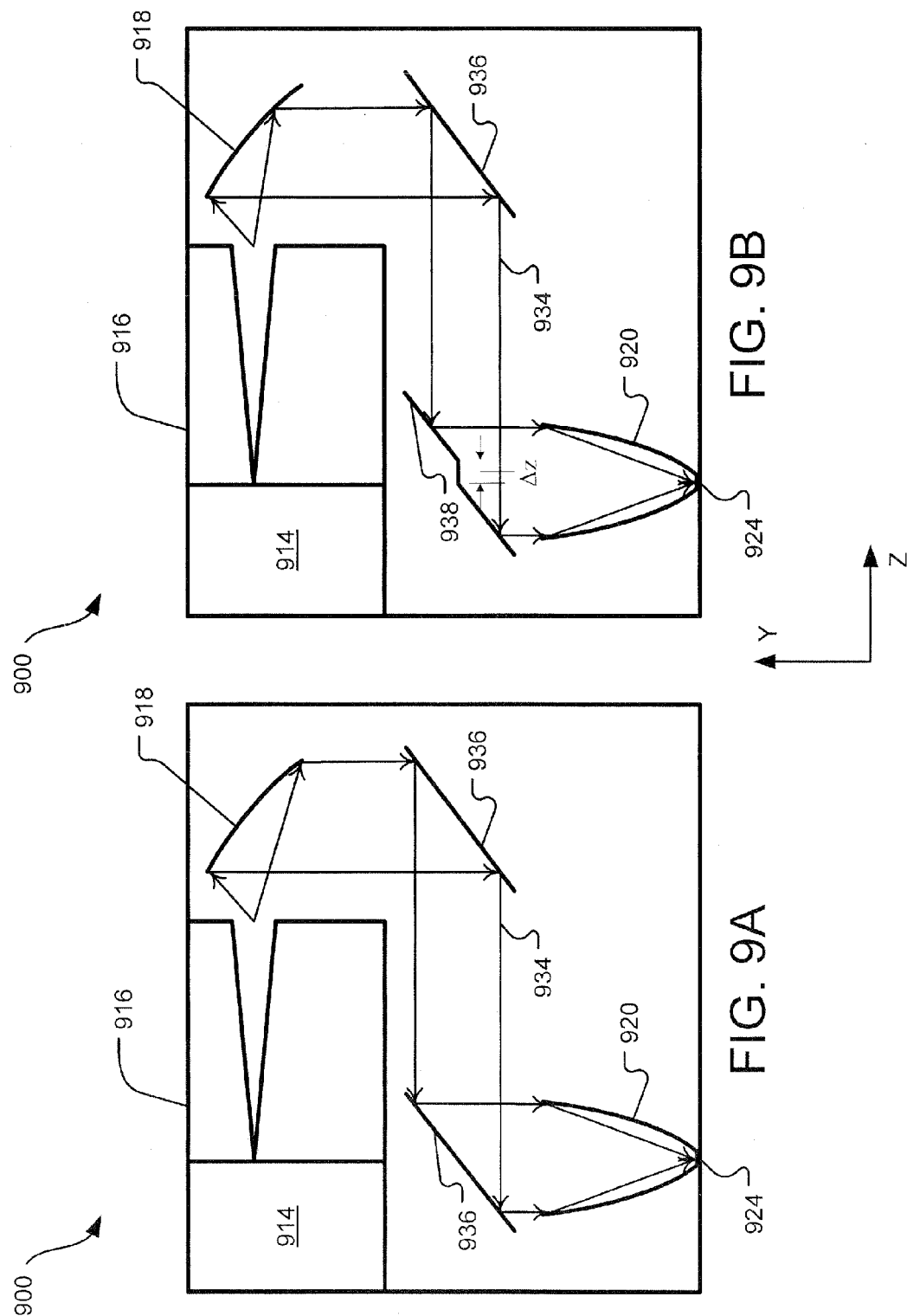

LIGHT DELIVERY WAVEGUIDE

BACKGROUND

"Heat assisted magnetic recording," optical assisted recording or thermal assisted recording (collectively hereinafter HAMR), generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, which is desirable for recording at increased areal densities, with a larger magnetic anisotropy at room temperature assuring a sufficient thermal stability. HAMR can be applied to any type of storage media, including for example, tilted media, longitudinal media, perpendicular media, and/or patterned media.

When applying a heat or light source to the magnetic medium, it is desirable to confine the heat or light to a track where writing is taking place and to generate the write field in close proximity to where the magnetic medium is heated to accomplish high areal density recording. In addition, one of the technological hurdles to overcome is to provide an efficient technique for delivering large amounts of light power to the recording medium confined to sufficiently small optical spots.

One way to achieve tiny confined hot spots is to use a near-field transducer, such as a plasmonic optical antenna or an aperture, integrated in a waveguide. Light propagating in the waveguide is focused by a focusing element, such as a planar solid immersion mirror into the near-field transducer. However, one of the challenges is to direct the light into the waveguide in a slider associated with the magnetic recording head with low cost, good alignment tolerance, and high light delivery efficiency. Systems and methods for achieving laser-in-slider light delivery are disclosed herein.

SUMMARY

In one implementation, a waveguide has a first core layer configured to receive light from a light source and transmit the light at a first mode profile associated with the light source. The waveguide also has a tapered portion of a second core layer configured to receive the light from the first core layer and transform the light to a second more confined mode profile.

This Summary is provided to introduce a selection of concepts in a simplified form that are further described below in the Detailed. Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

FIG. 4A is an example cross-section of a laser-in-slider light delivery system with one first core layer and two second core layers.

FIG. 4B is an example cross-section of a laser-in-slider light delivery system with a third cladding layer located between a first core layer and a second core layer.

FIG. 4C is an example cross-section of a laser-in-slider light delivery system with a second core layer below a first core layer.

FIG. 8A illustrates an example laser-in-slider light delivery system, where a collimating mirror is oriented so that light rays reflecting from the collimating mirror propagate toward an angled, double-sided, focusing mirror.

FIG. 8B illustrates an example laser-in-slider light delivery system where a collimating mirror is oriented so that light rays reflecting from the collimating mirror propagate toward an angled, single-sided, focusing mirror.

FIG. 9A illustrates an example laser-in-slider light delivery system where two straight mirrors are used to shift light rays reflecting from a collimating mirror.

FIG. 9B illustrates an example laser-in-slider light delivery system where a straight minor and a split straight mirror are used to shift light rays reflecting from the collimating mirror.

DETAILED DESCRIPTIONS

Figure 1:
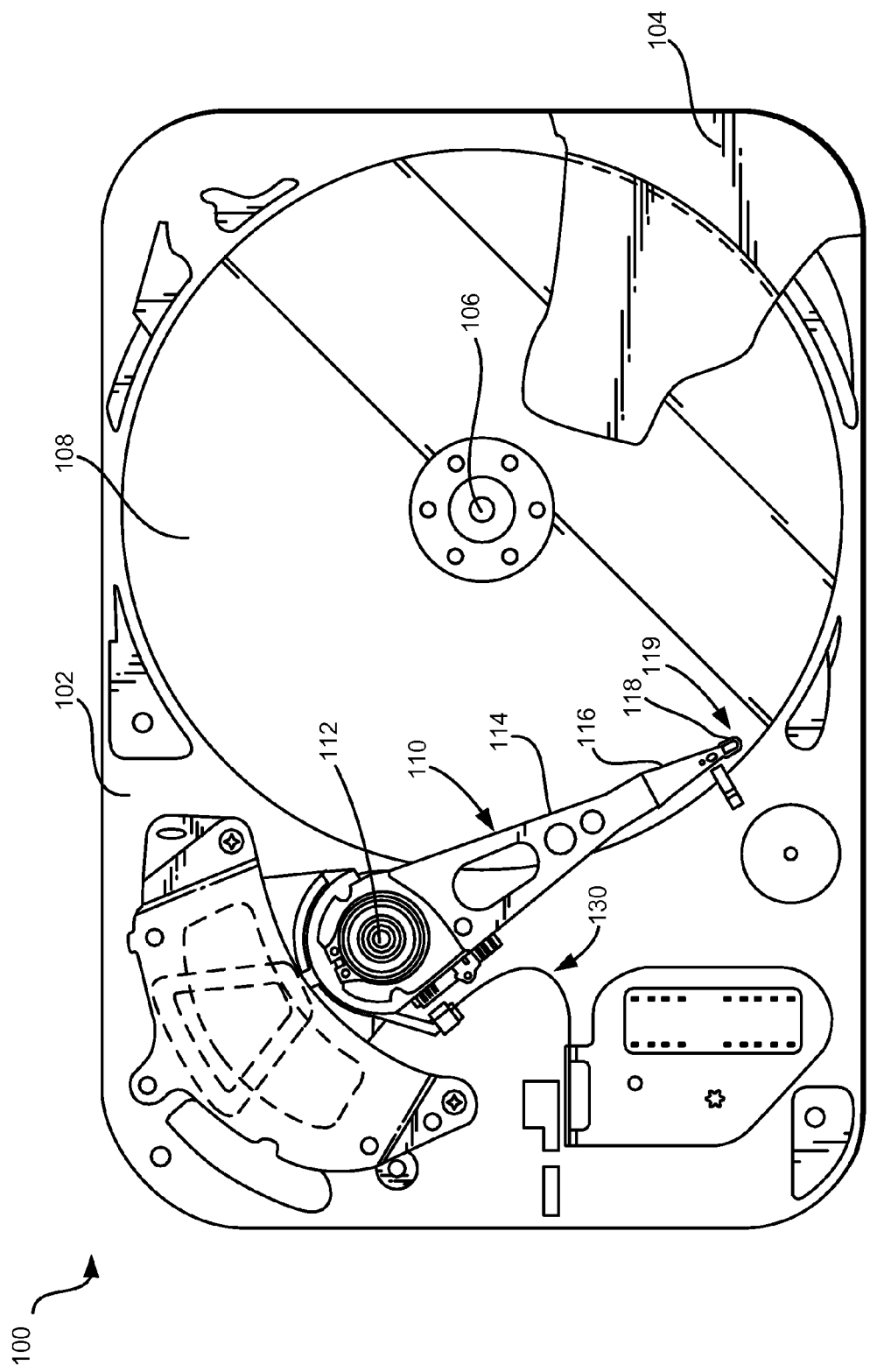
FIG. 1 illustrates a plan view of an example disc drive.

FIG. 1 illustrates a plan view of an example disc drive 100. The disc drive 100 includes a base 102 to which various components of the disc drive 100 are mounted. A top cover 104, shown partially cut away, cooperates with the base 102 to form an internal, clean environment for the disc drive in a conventional manner. The components include a spindle motor 106 that rotates one or more storage medium discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108. The distance between the head 118 and the storage media surface during flight is referred to as the fly height.

During a seek operation, the actuator assembly 110 pivots about the bearing shaft assembly 112 and the transducer heads 118 are caused to move across the surfaces of the discs 108. A flex assembly 130 provides the requisite electrical connection paths for the actuator assembly 110 while allowing pivotal movement of the actuator assembly 110 during operation. The flex assembly 130 also provides power for an on-slider laser light source.

In one implementation, the laser light source 119 (e.g., a laser diode) or other light source (e.g. a light emitting diode (LED)) is mounted on a trailing surface of the head 118 slider. Light from the laser light source 119 is directed into one or more core layers and through a waveguide also on the trailing surface of the head 118 slider. The light is then redirected and/or focused on a point on the disc 108 in close proximity to a write pole on the head 118 with mirrors. A near-field transducer (NFT) may also be mounted on the head 118 slider to further concentrate the light on the point on the disc 108. In another implementation, one or more of the laser light source 119, core layers, waveguide, mirrors, and/or NFT is mounted on an area of the head 118 away from the slider or on a head 118 slider surface other than the trailing surface.

Figure 2:
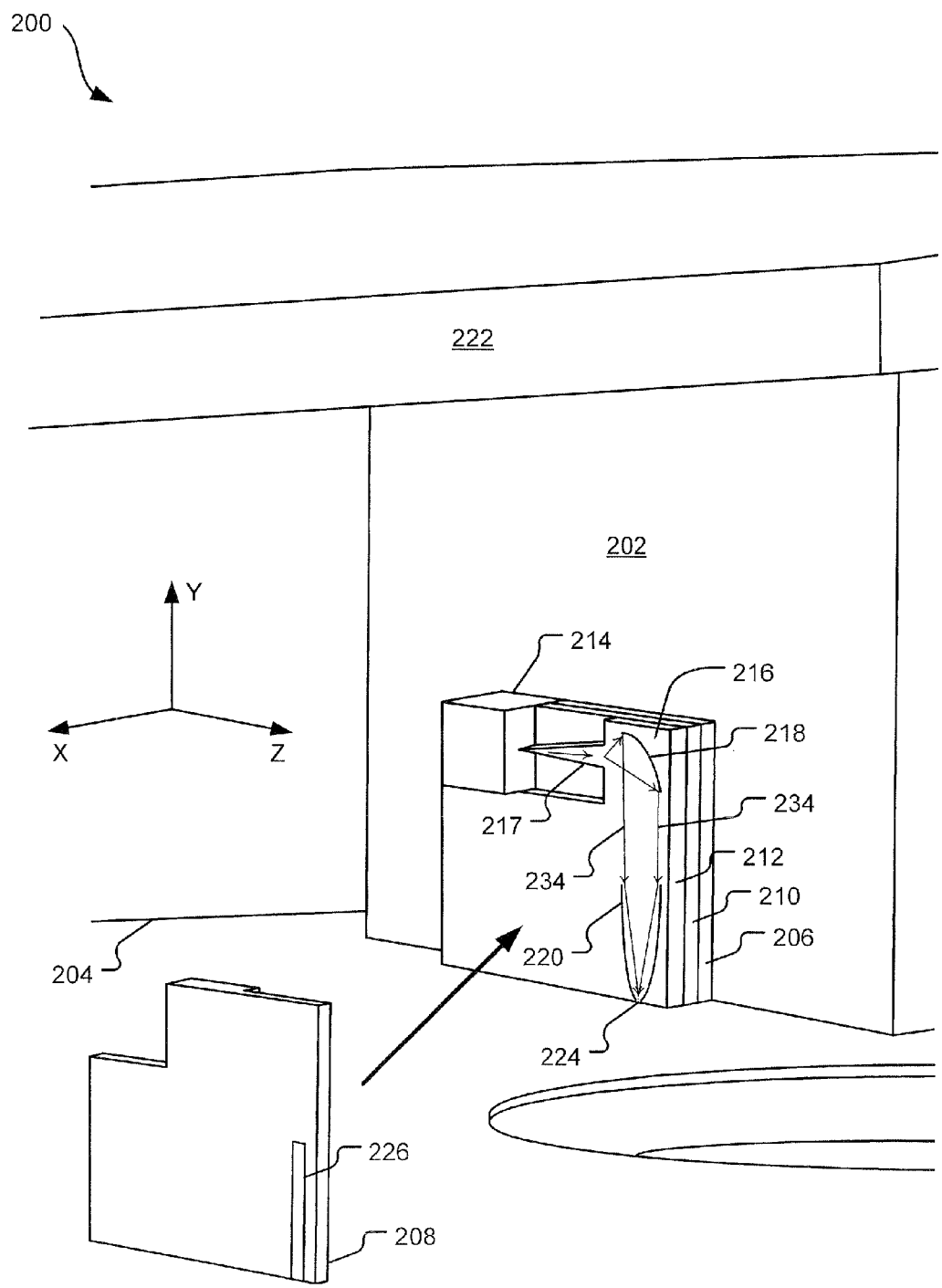
FIG. 2 illustrates an example partial isometric view of a trailing surface of a transducer head slider configured to fly in close proximity to a magnetic media disc with cladding layers, core layers, a laser diode, a waveguide, and mirrors mounted thereon.

FIG. 2 illustrates an example partial isometric view of a trailing surface of a transducer head slider 202 configured to fly in close proximity to a magnetic media disc 204 with cladding layers 206, 208, core layers 210, 212, a laser diode 214, a waveguide 216, and mirrors 218, 220 mounted thereon. The cladding layers 206, 208, core layers 210, 212, laser diode 214, waveguide 216, and mirrors 218, 220 collectively form one implementation of a laser-in-slider light delivery system 200.

The slider 202 is located at one end of an actuator arm and is suspended above the magnetic media disc 204 with a suspension 222, sometimes referred to as flexures. The suspension 222 enables the slider 202 to fly in closed proximity above the disc 204 as the disc 204 rotates during operation. The laser-in-slider light delivery system 200 is shown attached to a trailing surface of the slider 202, although the system 200 may be attached to other surfaces of the slider 202 and/or transducer head in other implementations.

A laser light source (e.g., the laser diode 214) or other light source (e.g., a light emitting diode (LED)) is shown mounted on the trailing surface of the slider 202. Immediately adjacent to the laser diode 214 is a first cladding layer 206 that separates the core layers 210, 212 from the slider 202. The core layer 210 is deposited substantially on top (in the X-direction) of the first cladding layer 206. The second core layer 212 is likewise deposited on top (in the X-direction) of the first core layer 210.

In an example manufacturing process, the first cladding layer 206 is first deposited on the slider 202. The first core layer 210 is deposited on top of the first cladding layer 206. The second core layer 212 is then deposited on top of the first core layer 210. A tapered portion 217 of the waveguide 216 adjacent to the laser diode 214 is then formed on the waveguide 216 by etching areas of the second core layer 212 adjacent the tapered portion 217 down to the first core layer 210. In some implementations, the etching is accomplished by photolithography. A second cladding layer 208 is then deposited on top of the second core layer 212.

Light rays 234 (illustrated by small arrows in FIG. 2) are emitted from the laser diode 214 (which in some implementations is an edge-emitting laser diode 214) and coupled into the waveguide 216 generally in the Z-direction. The waveguide 216 includes the first core layer 210 and the second core layer 212 for light ray 234 transmission and the first cladding layer 206 and the second cladding layer 208 to confine the light rays 234 to the first core layer 210 and the second core layer 212. As such, the cladding layers 206, 208 include materials that are dielectric and have a low index of refraction (e.g., $Al_2O_3$, $SiO_2$, and $MgF_2$).

While core layers 210, 212 are also dielectric, they have higher indices of refraction than the cladding layers 206, 208. The first core layer 210 functions to enhance light coupling efficiency from the laser diode 214 to the second core layer 212. The tapered portion 217 of the waveguide 216 on the second core layer 212 functions to couple the light propagating in the first core layer 210 into the second core layer 212 where the light is confined to a tighter mode profile. The mode profile of the light refers to a dimensional size and shape of an XY-plane cross section of the light as a function of light intensity (see FIGS. 5A-5F). As such, the first core layer 210 includes materials that have an index of refraction lower than the second core layer 212, but slightly higher than the cladding layers 206, 208 (e.g., SiON, ZnS, and $SiO_2$). The second core layer uses dielectric material with a high index of refraction (e.g., $Ta_2O_5$, $TiO_x$, $SiN_x$, SiC, and ZnS).

In the implementation shown in FIG. 2, the first core layer 210 and the second core layer 212 are intact in a region occupied by the mirrors 218, 220. A portion of the second core layer 212 is etched away within the waveguide 216 to form the tapered portion 217 in the second core layer 212. In other implementations, the first core layer 210 or both the first core layer 210 and second core layer 212 is etched away within the waveguide 216 to form the tapered portion 217. The tapered portion 217 of the waveguide 216 of FIG. 2 has a linear taper in the Z-direction with a narrow opening near the laser diode 214 where the light enters the waveguide 216 (i.e., the waveguide entrance) and a wider opening where the light exits the tapered portion 217 of the waveguide 216. However, in other implementations, the tapered portion 217 may be non-linear and encompass a variety of shapes optimized to achieve a fast mode transformation from the first core layer 210 to the second core layer 212.

A width of the tapered portion 217 of the waveguide 216 at the tapered portion 217 exit is selected such that the light rays 234 exiting the tapered portion 217 have a minimum amount of divergence but are still single-mode with a Gaussian-like spatial profile in the XY plane. In some implementations the light rays 234 exiting the tapered portion 217 are at a fundamental mode. The width of the tapered portion 217 exit may be chosen as wide as possible so that the light rays 234 can be collimated with a collimating mirror 218 having a low numerical aperture in-plane to achieve a manufacture tolerance. In implementations that utilize a channel waveguide to guide the light rays 234 from the tapered portion 217 to an air-bearing surface or near the air-bearing surface where a near-field transducer may be placed, the width of the tapered portion 217 exit and the waveguide taper is optimized so that the light rays 234 propagating in the channel waveguide are tightly confined.

Light rays 234 exiting the tapered portion 217 are directed toward the collimating mirror 218, an off-axis, single sidewall, parabolic mirror. The collimating mirror 218 makes the divergent light rays 234 exiting from the tapered portion 217 of the waveguide 216 parallel or nearly parallel and re-directs the collimated light rays 234 to the focusing mirror 220. The collimated light rays 234 proceed to the focusing mirror 220 in the negative Y-direction with little divergence in the Z-direction or X-direction. The focusing mirror 220, a double sidewall, parabolic mirror, focuses the collimated light rays 234 to a diffraction-limited optical spot 224. In some implementations, the diffraction-limited optical spot 224 is focused on a location on the magnetic media disc 204. In other implementations, the diffraction-limited optical spot 224 focuses on a near-field transducer. The near-field transducer serves to further condense the light rays 234 to a location on the magnetic media disc 204.

FIG. 2 illustrates one orientation of the collimating mirror 218 and the focusing mirror 220. However, other implementations may vary the size, shape, and/or orientation of the collimating mirror 218 and the focusing mirror 220 (see e.g., FIGS. 8A-9B). Further, some implementations may also utilize straight mirrors to redirect the light rays 234 and/or introduce a phase shift in the mode profile of the light.

The second cladding layer 208 (shown detached in FIG. 2) is deposited adjacent the laser diode 214 and substantially on top (in the X-direction) of the second core layer 214. The second cladding layer 208 may be thicker in the area of the waveguide 216 to fill in space around the tapered portion 217 created by etching away the second core layer 212. A write pole 226 may be incorporated into the second cladding layer 208 or mounted in close proximity to the second cladding layer 208. When fully assembled, the system 200 creates the diffraction-limited optical spot on the magnetic media disc in close proximity to the write pole 226. Thus, heat assisted magnetic recording on the magnetic media disc 204 is accomplished.

Figure 3:
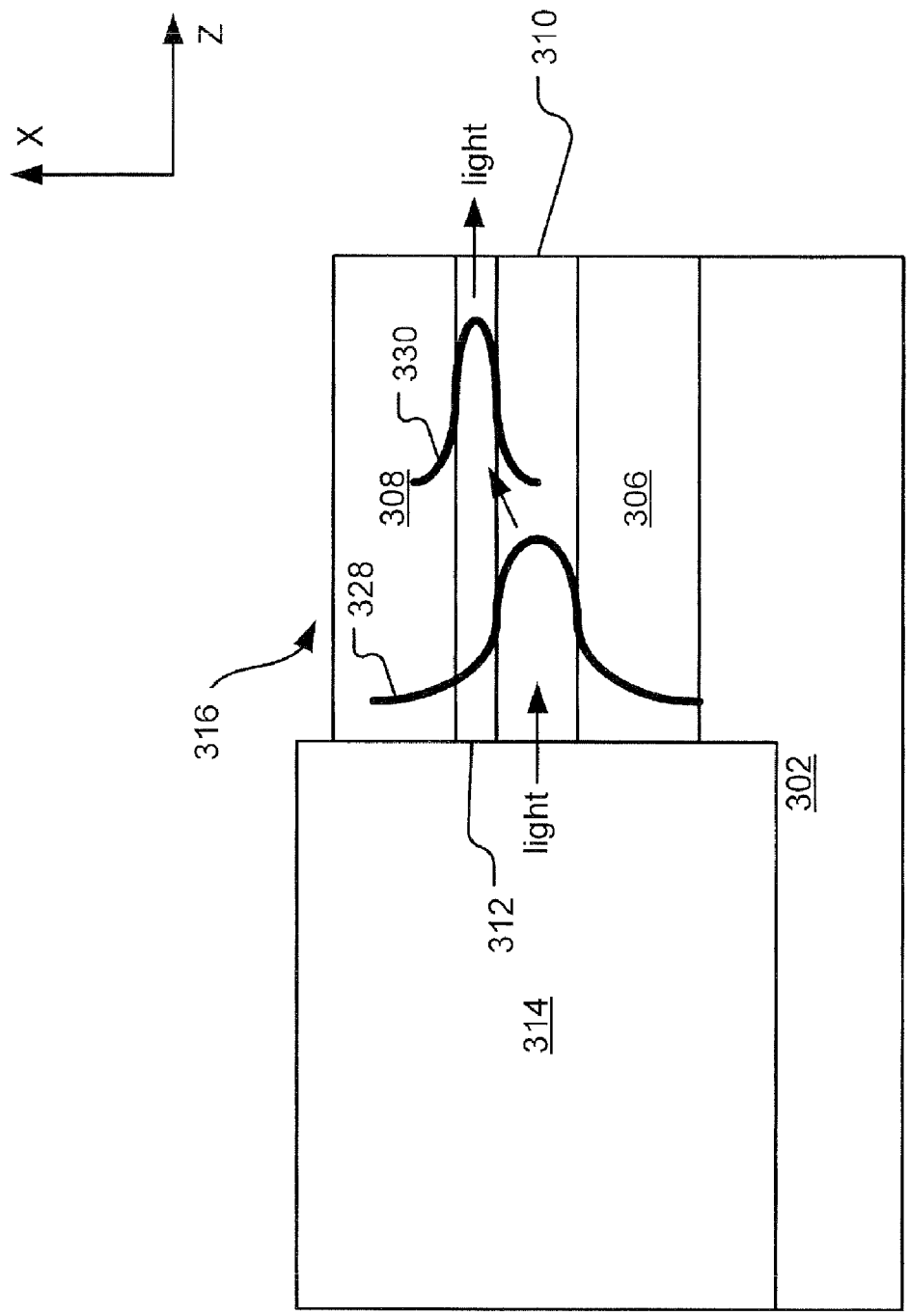
FIG. 3 is an example cross-section of a laser-in-slider light delivery system including a laser diode, cladding layers, and core layers, with a first mode profile and a second mode profile superimposed on the respective core layers.

FIG. 3 is an example cross-section of a laser-in-slider light delivery system 300 including a laser diode 314, cladding layers 306, 308, and core layers 310, 312 with a first mode profile 328 and a second mode profile 330 superimposed on the respective core layers 310, 312. The laser diode 314 and the first cladding layer 306 are mounted on a surface of a transducer head slider 302. In other implementations, the laser diode 314 is mounted to the second cladding layer 308. The first core layer 310, the second core layer 212, and the second cladding layer 308 are deposited on top (in the X-direction) of the first cladding layer 306. A combination of the cladding layers 306, 308 and the core layers 310, 312 make up a waveguide 316. One example cross-section of the laser-in-slider light delivery system 300 is illustrated by a top-down view of FIG. 2.

A thickness of the first core layer 310 in the X-direction is selected so that a first mode profile 328 of light within the first core layer 310 of the waveguide 316 best matches a mode profile of the laser diode 314 light output. A thickness of the second core layer 312 in the X-direction is selected to yield a tightly confined mode profile. Light rays (represented by arrows) emitting from the laser diode 314 first enter the first core layer 310 and then transfer to the second core layer 312 through adiabatic mode transformation along a length of a tapered portion of the waveguide 316 in the Z-direction. The tapered portion fabricated on the second core layer 312 is optimized so that the light is efficiently transformed from the first core layer 310 to the second core layer 312.

In the implementation of FIG. 3, the laser diode 314 is shown mounted within a cavity formed in the transducer head slider 302. However, in other implementations (see e.g. FIGS. 4A-4C), the laser diode 314 is shown mounted directly on a planar surface of the transducer head slider 302 without using a cavity. Further, FIG. 2 shows the laser diode thickness in the X-direction as greater than the thickness of the cladding layers 306, 308, and core layers 310 combined in the X-direction. However, in other implementations, the aforementioned thicknesses may be the same or the laser diode thickness may be less than the thickness of the cladding layers 306, 308, and core layers 310 combined.

FIG. 4A is an example cross-section of a laser-in-slider light delivery system 400 with two first core sub-layers 410 and one second core layer 412. Here, light rays (represented by arrows) emitting from a laser diode 414 enter a waveguide 416 through the two sub-layers 410 of the first core layer that sandwich the second core layer 412. The second core layer 412 includes a waveguide 416 with a tapered portion. As the light rays pass through the waveguide 416, the light rays are gradually transferred through the tapered portion formed on the second core layer 412 from each of the first core sub-layers 410. The light rays exit the tapered portion of the waveguide 416.

FIG. 4B is an example cross-section of a laser-in-slider light delivery system 405 with a third cladding layer 432 located between a first core layer 410 and a second core layer 412. Here, light rays (represented by arrows) emitting from a laser diode 414 enter a waveguide 417 through a first core layer 410. The second core layer 412 includes a waveguide 417 with a tapered portion. As the light rays pass through the waveguide 417, the light rays are gradually transferred by resonant tunneling through the third cladding layer 432 to the tapered portion formed on the second core layer 412 from the first core layer 410. The light rays exit the tapered portion of the waveguide 417.

FIG. 4C is an example cross-section of a laser-in-slider light delivery system 415 with a second core layer 412 below a first core layer 410. Here, light rays (represented by arrows) emitting from a laser diode 414 enter a waveguide 419 through a first core layer 410. The second core layer 412 includes a waveguide 419 with a tapered portion. As the light rays pass through the waveguide 419, the light rays are gradually transferred through the tapered portion formed on the second core layer 412 from the first core layer 410. The light rays exit the tapered portion of the waveguide 419. Positioning the second core layer 412 below the first core layer 410 allows an etching on a slider for placing the laser diode 414 to be reduced. This occurs because the first core layer 410 is located further from the slider in the X-direction than in an implementation where the first core layer 410 is positioned below the second core layer 412.

FIGS. 5A-5F illustrate an example series of mode profiles representing light passing through a waveguide at various distances from a laser diode. Each mode profile depicts an intensity level of the light varying with size of the mode profile in an X-direction and a Y-direction (referencing FIG. 2).

An example waveguide is described below that generates the mode profiles depicted in FIGS. 5A-5F. A 120 nm thick $Ta_2O_5$ second core layer is used with an index of refraction (n) equaling to 2.15. Further, an 800 nm thick SiON first core layer is used with an index of refraction (n) equaling to 1.70. The cladding layers are $Al_2O_3$ and have an index of refraction (n) equaling to 1.65. A tapered portion of the waveguide is linear, 100 μm long, with a waveguide entrance width equaling 100 nm and a tapered portion exit width equaling 600 nm. The laser diode is edge-emitting with an edge junction parallel to a waveguide plane (YZ plane of FIG. 2) and centered at the first core layer. Light emitted from the laser diode had full divergence angles at full-width-at-half-maximum of 7.74° parallel to the edge junction and 26° normal to the edge junction.

Figure 5A:
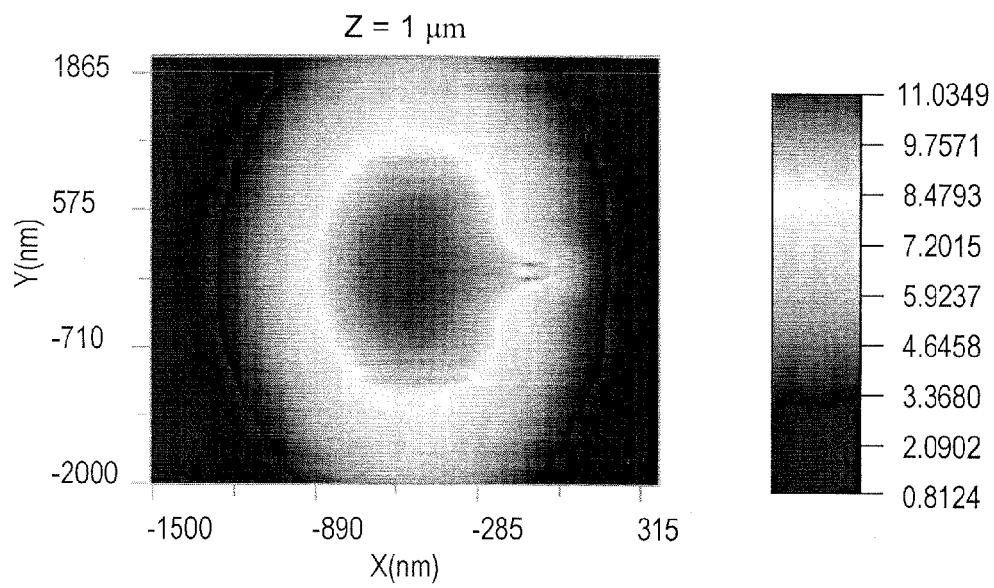
FIGS. 5A-5F illustrate an example series of mode profiles representing light passing through a waveguide at various distances from a laser diode.
Figure 5B:
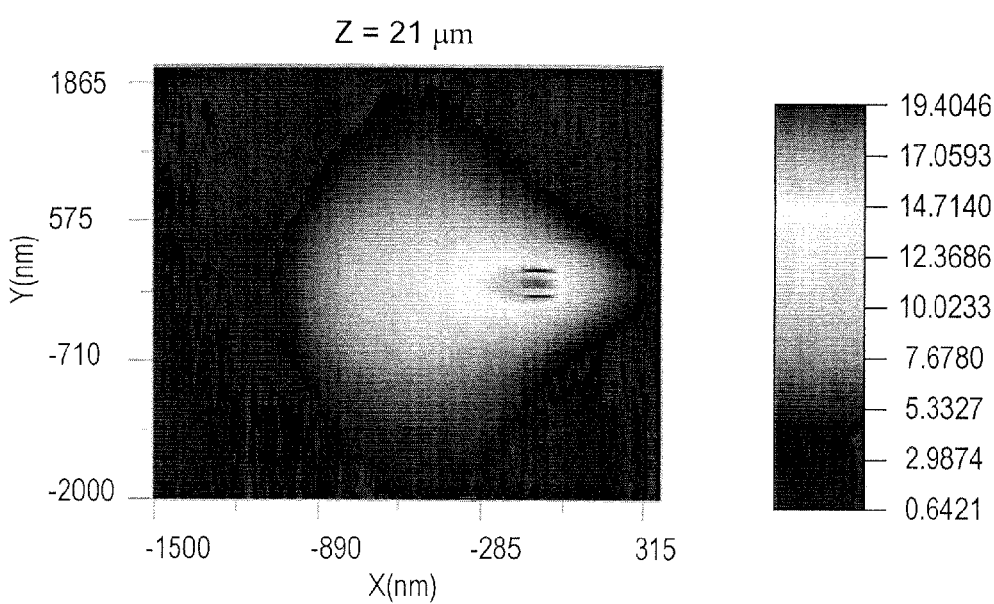
Figure 5C:
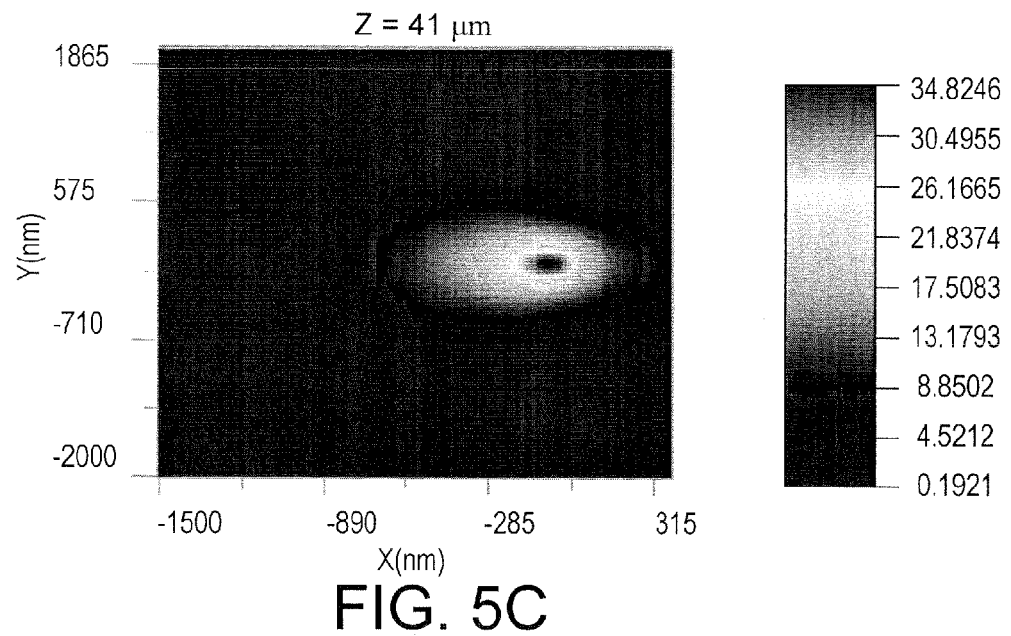
Figure 5D:
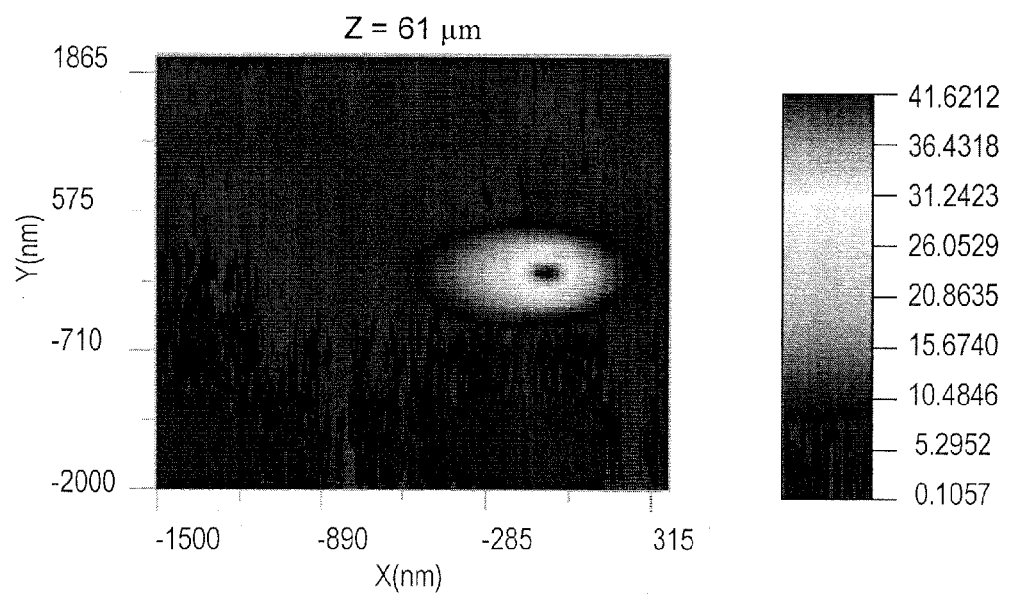
Figure 5E:
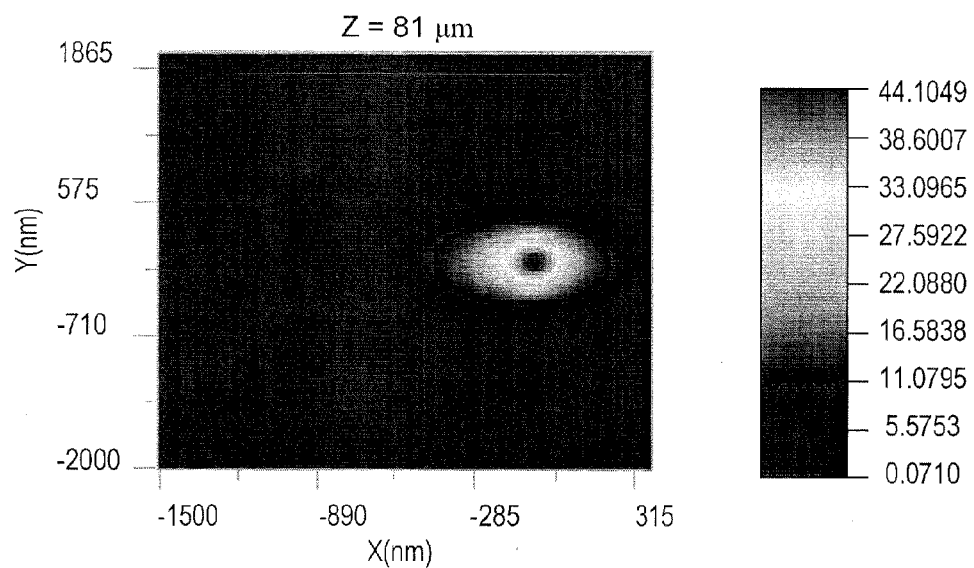
Figure 5F:
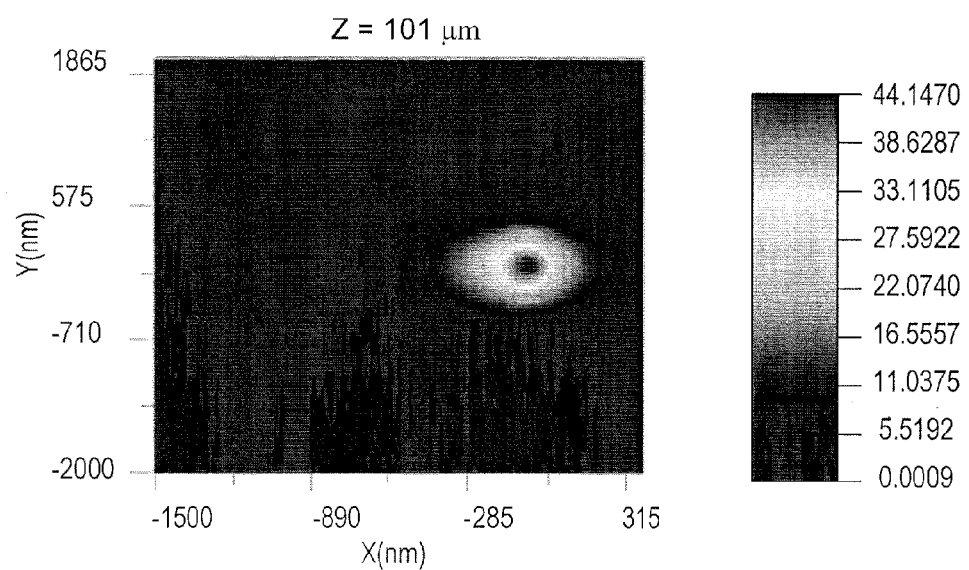

FIG. 5A illustrates the mode profile at 1 μm from the waveguide entrance in the Z-direction. The corresponding full-width-at-half-maximum intensity (FWHM) is 0.868 μm along the X-direction and 2.270 μm along the Y-direction (referencing the system 200 of FIG. 2). After a 21 μm propagation of the light through the waveguide (shown in FIG. 5B), the illustrated mode profile shrinks rapidly and a center of the light shifts from the first core layer to the second core layer (not shown). FIG. 5C illustrates the mode profile after the light propagates 41 μm through the waveguide. At 41 μm, the light is almost completely transferred to the second core layer (not shown) and illustrated mode profile reaches a minimum Y-direction dimension (~305 nm). With the light propagating further in the Z-direction (see FIGS. 5D-5F), the mode profile expands along the Y-direction slightly with an increase in width of the waveguide taper. In this implementation, light delivery efficiency is estimated at 87%.

The light delivery efficiency depends in part on the thickness in the X-direction (referencing FIG. 2) of the first core layer. The ideal thickness for the first core layer to achieve maximum light delivery efficiency is where the mode profile of the first core layer closely matches the mode profile of the light coming from the laser diode. In the implementation shown in FIGS. 5A-5F, the ideal first core layer thickness is approximately 700 nm. However, this thickness will vary for materials with a different refractive index.

Figure 6B:
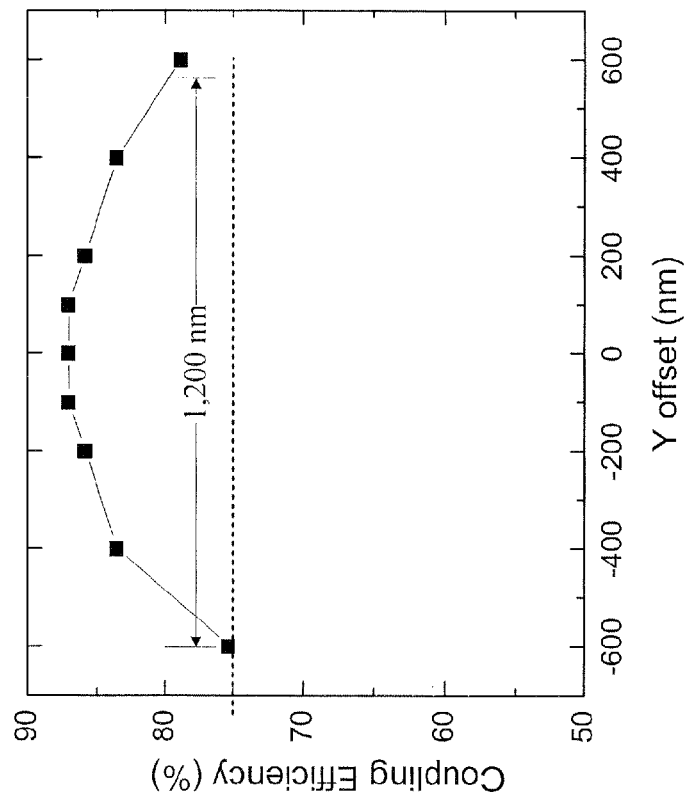
FIGS. 6A-6B illustrate example positioning tolerances of a laser diode with respect to the waveguide of FIGS. 5A-5F.
Figure 6A:
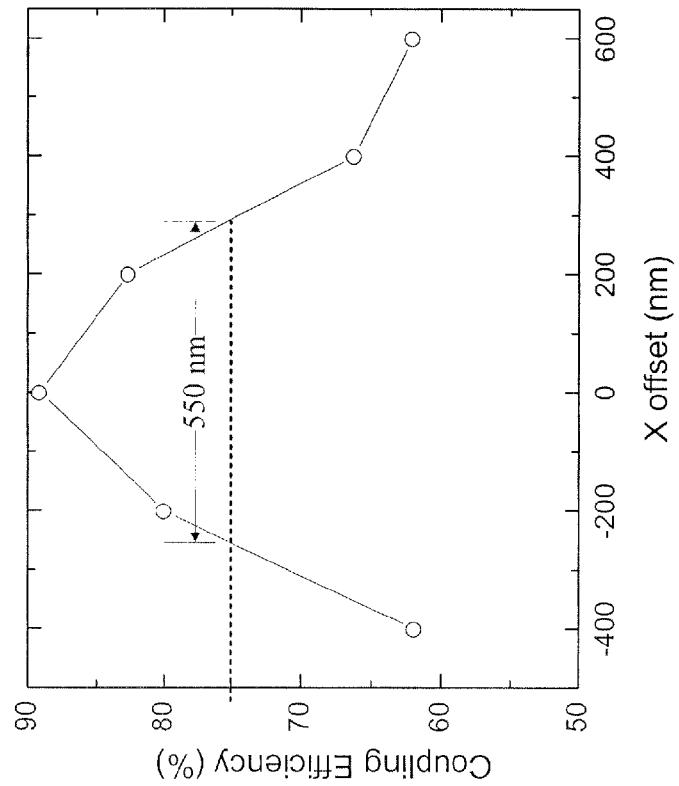

FIGS. 6A-6B illustrate example positioning tolerances of a laser diode with respect to the waveguide of FIGS. 5A-5F. The presently disclosed technology allows for a good tolerance in positioning the laser diode relative to the waveguide. Referring to FIG. 6A, assuming that a light delivery efficiency (or coupling efficiency) drop from 90% to 75% is acceptable; the positioning tolerance in the X-direction is approximately 550 nm. Referring to FIG. 6B, still assuming that a light delivery efficiency drop from 90% to 75% is acceptable; the positioning tolerance in the Y-direction is approximately 1,200 nm.

Emission wavelength of an edge emitting laser diode with a Fabry-Perot resonator typically varies with temperature at 0.1 nm-0.2 nm per degree Celsius. Based on the expected temperature fluctuations (i.e. less than 100° C.), the emission wavelength variation is within 20 nm. Modeling shows that the coupling efficiency variation is lower than 5% if the wavelength variation is within approximately 30 nm.

Figure 7B:
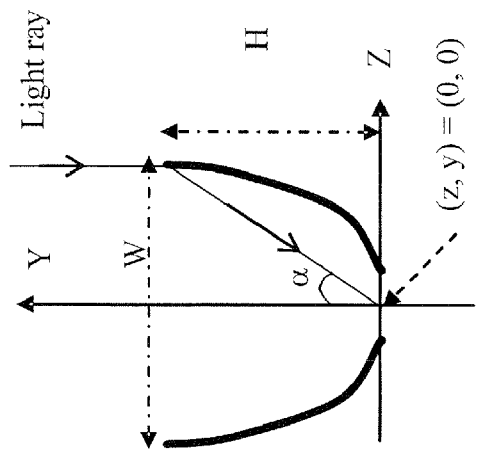
FIG. 7B illustrates collimated light reflecting off of an example focusing mirror and converging at a focusing point.
Figure 7A:
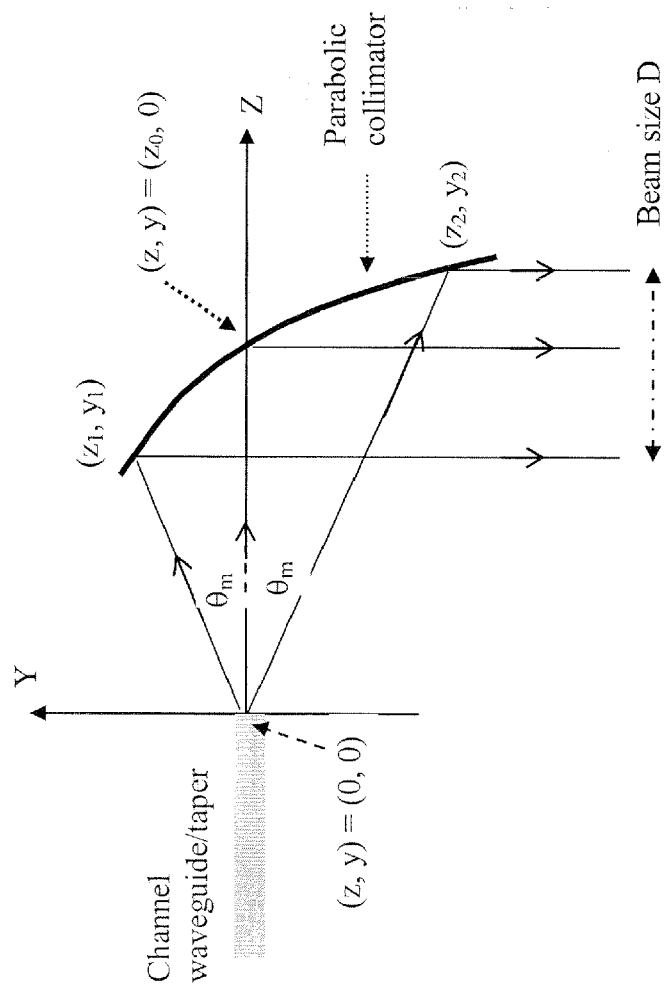
FIG. 7A illustrates light passing through a waveguide and reflecting off of an example collimating mirror.

FIG. 7A illustrates light passing through the waveguide and reflecting off of an example collimating mirror. In a YZ cross section of the collimating mirror of FIG. 2, light passing through the waveguide is collimated and bent 90°. A maximum ray angle from Z-axis is $\theta_m$ and a beam size after collimation is D. The collimating mirror is parabolic in the YZ plane and is located $z_0$ away from a tapered portion exit. Assuming the coordinate (z, y)=(0, 0) is defined as the tapered portion exit, the parabolic shape of the collimating mirror may be defined as $$y = \frac{z_0^2 - z^2}{2z_0};$$

wherein
$z_0$ is a location of the collimating mirror on the z-axis when y=0. The beam size (D) may then be calculated based on known $\theta_m$ and $z_0$ values according to:

$$D = z_2 - z_1 = \frac{z_0}{\cos\theta_m}(1 + \sin\theta_m) - \frac{z_0}{\cos\theta_m}(1 - \sin\theta_m) = 2z_0\tan\theta_m;$$

wherein
$z_1$ is a first limit of the collimated beam in the z-direction,
$z_2$ is a second limit of the collimated beam in the z-direction, and
$\theta_m$ is a divergence angle of the light passing through the waveguide from the z-axis at $1/e^2$ intensity point.

FIG. 7B illustrates collimated light reflecting off of an example focusing mirror and converging at a focusing point. The focusing mirror has two parabolic sidewalls with opening width (W) and height (H). In a YZ cross section of the focusing mirror of FIG. 2, collimated light is reflected off of the sidewalls and focused at a specific point in space (e.g., a diffraction-limited optical spot). In the implementation of FIG. 7B, this focusing point is defined as (z, y)=(0, 0). The shape of the mirror may be calculated by solving for y as a function of z according to the following equation.

$$y = \beta z^2 - 1/(4\beta)$$

Further, the parameter ($\beta$) may be calculated using the following equation, $$\beta = \frac{\frac{2H}{W} + \sqrt{1 + \left(\frac{2H}{W}\right)^2}}{W}$$

In FIG. 7B, the focusing mirror has two complementary sidewalls. If the phase wavefront of the incident beam on the focusing mirror is uniform, the electric field of the focal point will be along the Z-direction for a $TE_0$ mode and X-direction for a $TM_0$ mode. However, some near-field transducers require excitation by a longitudinally polarized focused spot, i.e., the electric field at the focal point is along the Y-direction. One way to achieve a longitudinally focused spot is to use two sidewalls with differing shapes. Assuming $\beta_L$ is a shape parameter for the left sidewall, $\beta_R$ of a shape parameter for the right sidewall can be calculated by $$\beta_R = \frac{1}{\frac{1}{\beta_L} + \frac{\lambda}{n_{\textit{eff}}}};$$

wherein
$\lambda$ is a wavelength of light rays in free space, and
$n_{\textit{eff}}$ is an effective mode index of the waveguide where the focusing mirror is located.

Referring back to FIG. 2, in some implementations the transducer head slider 202 is especially narrow in the Z-direction and/or the laser diode 214 is especially long in the Z-direction. In these implementations, the orientation of the collimating mirror 218 and focusing minor 220 of FIG. 2 does not yield a focusing point 224 (or diffraction-limited optical spot) near a center of the slider 202 in the Z-direction where the write pole 226 is located. FIGS. 8A-9B illustrate mirror and mirror orientations that move the focusing point 224 in the negative Z-direction to align the focusing point 224 with the write pole 226, in the Z-direction.

FIG. 8A illustrates an example laser-in-slider light delivery system 800, where a collimating mirror 818 is oriented so that light rays 834 reflecting from the collimating mirror 818 propagate toward an angled, double-sided, focusing mirror 820. The system 800 of FIG. 8A includes a laser diode 814, a waveguide 816, the collimating mirror 818, and the focusing mirror 820 as described with respect to FIG. 2. However, a shape and/or orientation of the collimating mirror 818 and the focusing mirror 820 are changed so that a focusing point 824 moves in a negative Z-direction (referencing FIG. 2).

More specifically, light rays 834 passing through the waveguide 816 are collimated and reflected off of the collimating mirror 818. The collimating mirror 818 reflects the light rays 834 in a negative Z-direction as well as a negative Y-direction. In order to capture the angled collimated light rays 834, the focusing mirror 820 is similarly angled and directs focused light rays 834 to a focusing point 824 shifted in the negative Z-direction when compared to the focusing point 224 of FIG. 2.

FIG. 8B illustrates an example laser-in-slider light delivery system 800 where a collimating mirror 821 is oriented so that light rays 834 reflecting from the collimating mirror 821 propagate toward an angled, single-sided, focusing mirror 823. While the implementation of FIG. 8B is similar to the implementation of FIG. 8A, the focusing mirror 823 is single-sided instead of double-sided. A single-sided focusing mirror has potential advantages of being less complex to design and/or manufacture and it occupies less space than an equivalent double-sided focusing mirror. However, the single-sided focusing mirror is likely to produce a larger, less-confined focusing point 824 than the double-sided focusing mirror.

FIG. 9A illustrates an example laser-in-slider light delivery system 900 where two straight mirrors 936 are used to shift light rays 934 reflecting from the collimating mirror 918. The system 900 of FIG. 9A includes a laser diode 914, a waveguide 916, the collimating mirror 918, and the focusing mirror 920 as described with respect to FIG. 2. However, two additional straight mirrors 936 are incorporated to shift the focusing point 924 in a negative Z-direction (referencing FIG. 2).

More specifically, light rays 934 passing through the waveguide 916 are collimated and reflected off of the collimating mirror 918. However, in the implementation of FIG. 9A, the collimated light rays 934 do not proceed directly to the focusing mirror 920. Instead, the collimated light rays 934 are first reflected off a straight mirror 936 in the negative Z-direction and then off another straight mirror 936 in the negative Y-direction. The collimated light rays 934 then are directed to a focusing point 924 by the focusing mirror 920 as described with regard to FIG. 2. The net effect of the two straight mirrors 936 is that the focusing point 924 is shifted in the negative Z-direction when compared to the implementation of FIG. 2.

FIG. 9B illustrates an example laser-in-slider light delivery system 905 where a straight mirror 936 and a split straight mirror are used to shift light rays 934 reflecting from the collimating mirror 918. While similar to the implementation of FIG. 9A, FIG. 9B illustrates a split straight mirror 938 with one half of the split straight mirror 938 shifted transversely in the Z-direction ($\Delta z$). The additional straight mirrors 936 and/or split straight mirror 938 in the implementations of FIGS. 9A and 9B decrease a light delivery efficiency of the system 905 due to Fresnel reflection loss.

The split straight mirror 938 is utilized in order to reduce or eliminate light rays 934 directed to a bottom of the focusing mirror 920, where the light rays 934 are not effectively reflected to the focusing point 924. This is referred to herein as reducing or eliminating obscuration in the focusing mirror 920. Further, the split straight mirror 938 may be utilized to introduce a phase shift in the light rays 934 directed to the focusing mirror.

In one implementation, the amount of shift ($\Delta z$) of the split straight mirror 938 can be calculated according to $$\Delta z = m \frac{\lambda}{n_{eff}} \leq \frac{1}{\beta}$$

where m is a positive integer representing 1, 2, 3 . . . , which satisfies above inequality, $\lambda$ is a wavelength of the light rays 934 in free space, $n_{eff}$ is an effective mode index of the waveguide 916 where the focusing mirror 920 is located, and $\beta$ is a parameter describing the shape of the focusing mirror 920.

The split straight mirror 938 may also be utilized to achieve a longitudinally focused spot as discussed with regard to FIG. 7B. Further, the collimating mirror 918 and/or focusing mirror 920 may also be split to achieve a longitudinally focused spot. In the implementation of FIG. 9B, the distance ($\Delta z$) to achieve a $\pi$ phase-shifted wavefront is given by $$\Delta z = \left(m + \frac{1}{2}\right) \frac{\lambda}{n_{eff}} \leq \frac{1}{\beta}.$$

In implementations where the collimated beam after the collimator 918 is particularly small and the distance from the collimator 918 to the focusing mirror 920 is much longer than the Rayleigh distance, $$\frac{\pi(0.5D)^2}{\lambda},$$

the collimated beam from the collimator 918 may become divergent as the light propagates toward the focusing mirror 920. This is due to diffraction of the light beam. To compensate for imperfect collimation, the final beam size incident on the focusing mirror 920 can be adjusted and the phase wavefront can be corrected by replacing the straight mirror 936 with a concave mirror.

Figure 10:
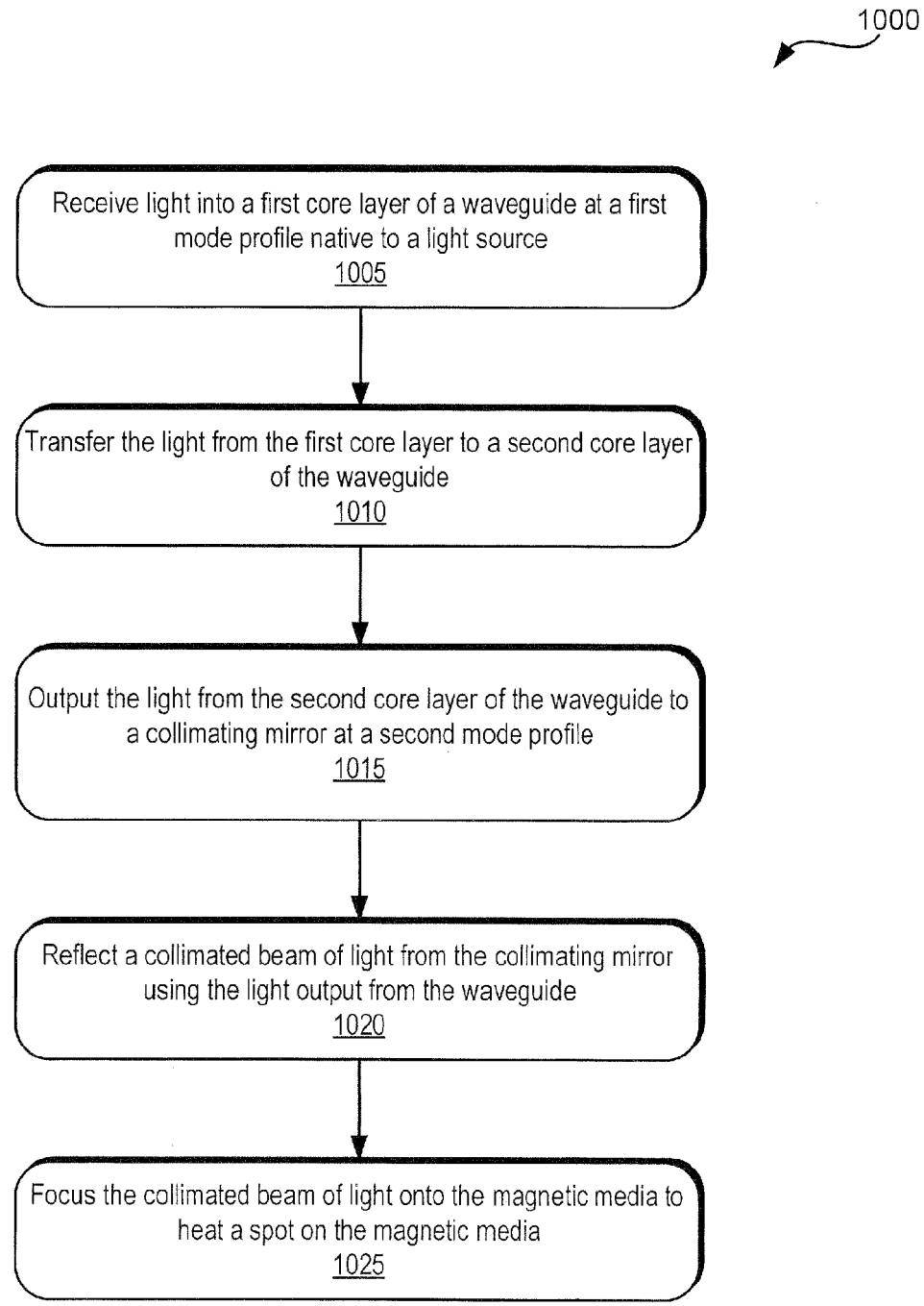
FIG. 10 is a flow chart illustrating example operations for directing light from a light source, through a waveguide, and focusing the light on a magnetic media for heat assisted magnetic recording.

FIG. 10 is a flow chart illustrating example operations 1000 for directing light from a light source, through a waveguide, and focusing the light on a magnetic media for heat assisted magnetic recording. Light from a light source is received into a first core layer of a waveguide on a recording head in operation 1005. The light has a first mode profile associated with the light source (e.g., native to the light source). The light is gently transferred to a second layer of the waveguide over a length of the waveguide in operation 1010. When the light is transferred to the second layer, the mode profile is gradually changed to a second mode profile.

The light with the second mode profile is then output to a collimating minor in operation 1015. The collimating minor then collimates divergent light rays passing through the waveguide and re-directs the collimated light to a focusing mirror in operation 1020. The focusing mirror focuses the light on a spot on the magnetic recording media in close proximity to a spot of the magnetic recording media where data will be written in operation 1025. In alternate implementations, the focusing minor focuses the light on a near-field transducer rather than a spot on the magnetic recording media. The near-field transducer then further condenses the light to the spot on the magnetic recording media.

While implementations of the waveguide, collimating mirror, and/or focusing minor disclosed herein are discussed specifically with regard to heat assisted magnetic recording technology applications, the presently disclosed technology is equally applicable to any optics system (e.g., photonic integrated circuits) where precise light delivery at very low loss is desired. For example, the presently disclosed technology may be applied to fibre-optic communication systems, biomedical devices, and photonic computing devices, for example.

The above specification and examples provide a complete description of the structures of exemplary implementations of methods and apparatus that may be used for light delivery for heat assisted magnetic recording. Although various implementations of the method and apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. The implementations described above and other implementations are within the scope of the following claims.

What is claimed:

1. A waveguide comprising:
a first core layer configured to receive light from a light source and transmit the light at a first mode profile associated with the light source; and
a tapered portion of a second core layer configured to receive the light from the first core layer and transform the light to a second more confined mode profile;
wherein the light transfers from the first core layer to the second core layer along a length of the tapered portion of the second core layer of the waveguide.

2. The waveguide of claim 1, further comprising:
a collimating mirror having a mode profile that matches the second mode profile.

3. The waveguide of claim 1, wherein the first core layer includes a material having a first refractive index and the second core layer includes a material having a second refractive index that is greater than the first refractive index.

4. The waveguide of claim 1, further comprising a focusing mirror to focus the light onto a magnetic media.

5. The waveguide of claim 1, further comprising:
one or more cladding layers adapted to confine the light within the first core layer and the second core layer.

6. The waveguide of claim 1, wherein the first core layer includes two or more sublayers.

7. The waveguide of claim 1 incorporated in a heat assisted magnetic recording head.

8. The waveguide of claim 1 mounted on a recording head slider.

9. The waveguide of claim 1 mounted on a trailing edge of a recording head slider.

10. A method of directing light from a light source, the method comprising:
receiving light into a first core layer of a waveguide at a first mode profile;
transferring the light from the first core layer to a tapered portion of a second core layer of the waveguide along a length of the tapered portion of the waveguide; and
outputting the light from the tapered portion of the second core layer of the waveguide at a second more confined mode profile.

11. The method of claim 10, further comprising:
focusing the light onto a magnetic media to heat a spot on the magnetic media.

12. The method of claim 11, wherein the focusing operation is accomplished using one or both of a focusing mirror and a near-field transducer.

13. The method of claim 10, further comprising:
reflecting a collimated beam of light having a desired width from a collimating mirror using the light output from the tapered portion of the waveguide.

14. The method of claim 10, further comprising reflecting the collimated beam of light from two or more straight mirrors to laterally shift the collimated beam of light.

15. A method of directing light from a light source, the method comprising:
receiving light into a first core layer of a waveguide at a first mode profile associated with the light source;
outputting the light from a tapered portion of a second core layer of the waveguide at a second mode profile that is more confined than the first mode profile; and
reflecting a collimated beam of light having a desired width from a collimating mirror using the light output.

16. The method of claim 15, further comprising:
focusing the collimated beam of light onto a magnetic media to heat a spot on the magnetic media.

17. The method of claim 16, wherein the focusing operation is accomplished using one or both of a focusing mirror and a near-field transducer.

18. The method of claim 15, wherein a shape of the collimating mirror may be written in terms of y as a function of z using $$y = \frac{z_0^2 - z^2}{2z_0},$$

and
wherein
$z_0$ is a location of the collimating mirror on the z-axis when y equals 0.

19. The method of claim 15, wherein the desired width D of the collimated beam may be calculated using $$D = z_2 - z_1 = \frac{z_0}{\cos\theta_m}(1 + \sin\theta_m) - \frac{z_0}{\cos\theta_m}(1 - \sin\theta_m) = 2z_0\tan\theta_m,$$

and
wherein
$z_0$ is a location of the collimating mirror on the z-axis when y=0,
$z_1$ is a first limit of the collimated beam in the z-direction,
$z_2$ is a second limit of the collimated beam in the z-direction, and
$\theta_m$ is ½ a divergence angle of the light passing through the waveguide.

20. The method of claim 15, further comprising:
reflecting the collimated beam of light from two or more straight mirrors to laterally shift the collimated beam of light.

* * * * *